April 27, 1948.   B. BOGOSLOWSKY   2,440,390
APPARATUS FOR MAKING CONVOLUTE WOUND TUBING FROM SHEET MATERIAL
Filed Oct. 27, 1944   4 Sheets-Sheet 3
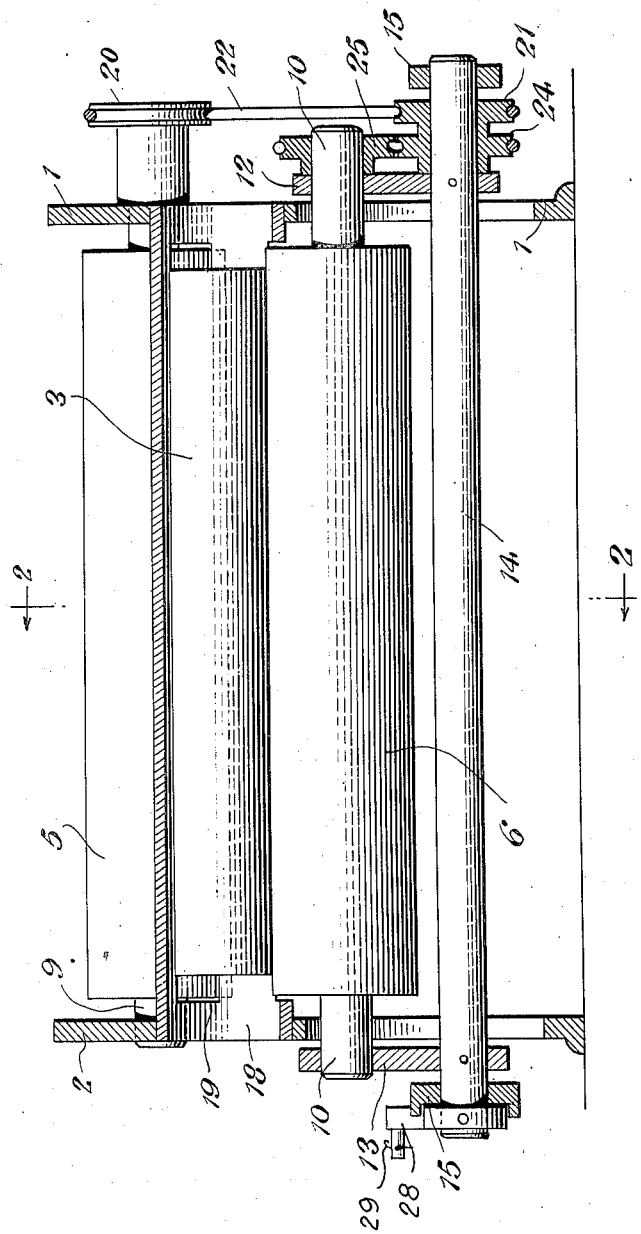
INVENTOR
Boris Bogoslowsky
Emery, Varney, Whittemore & Dix
ATTORNEY

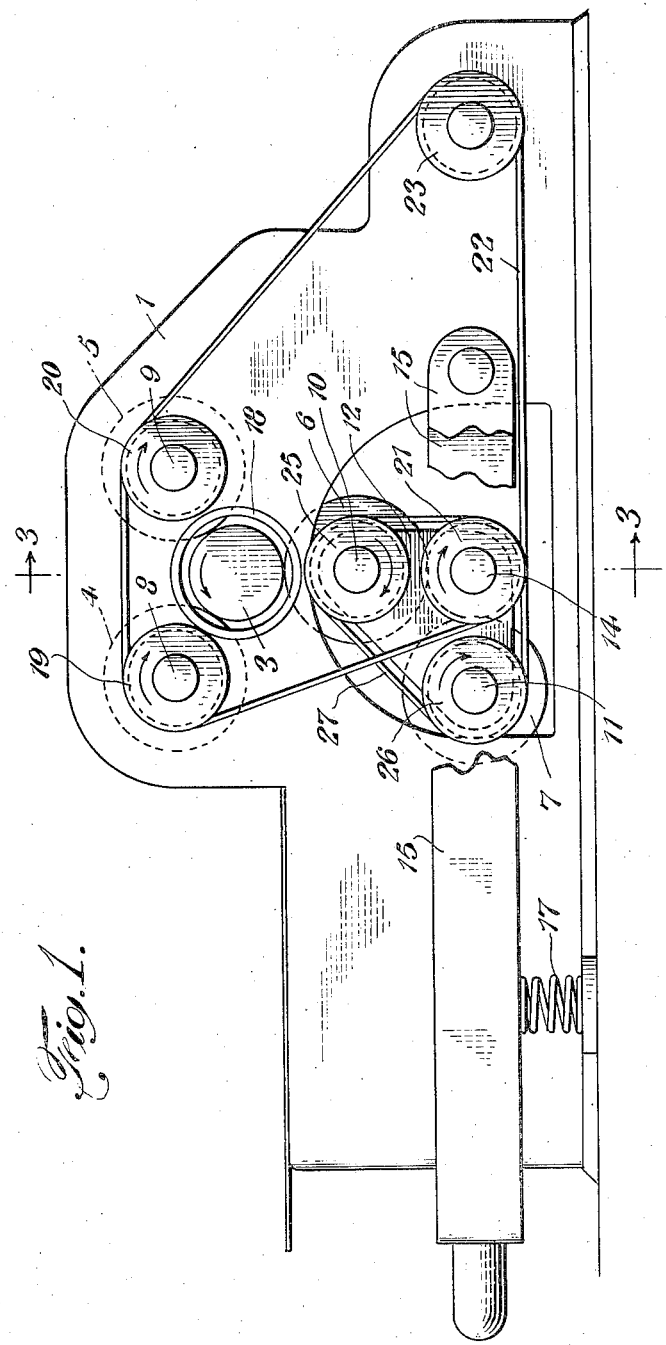

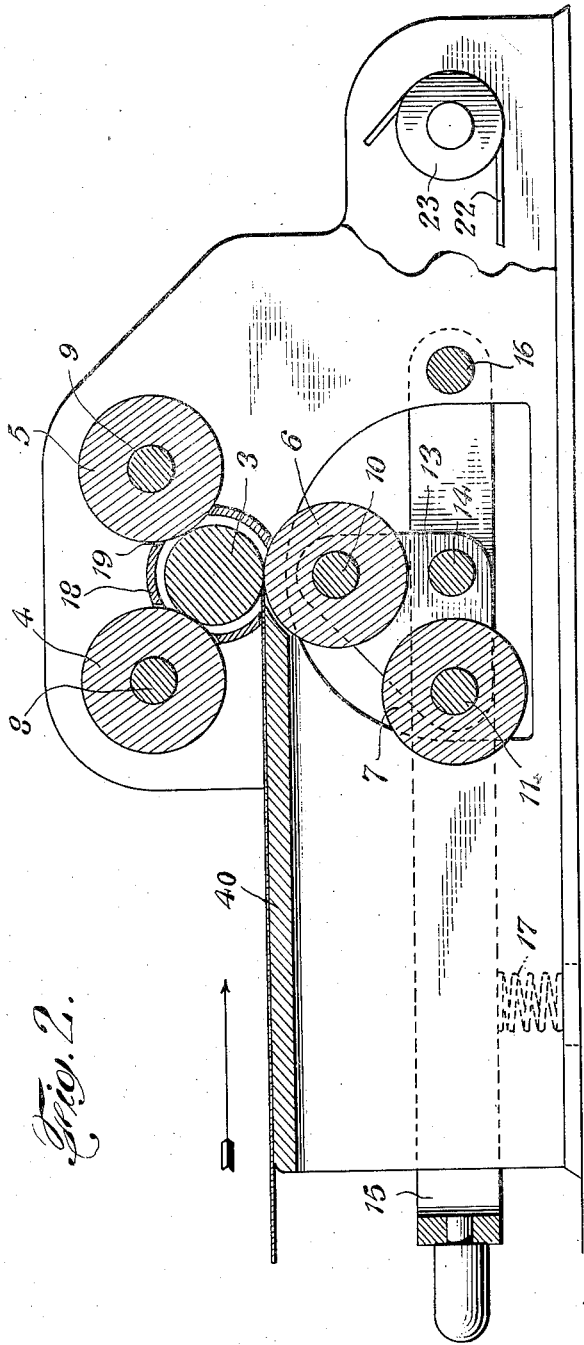

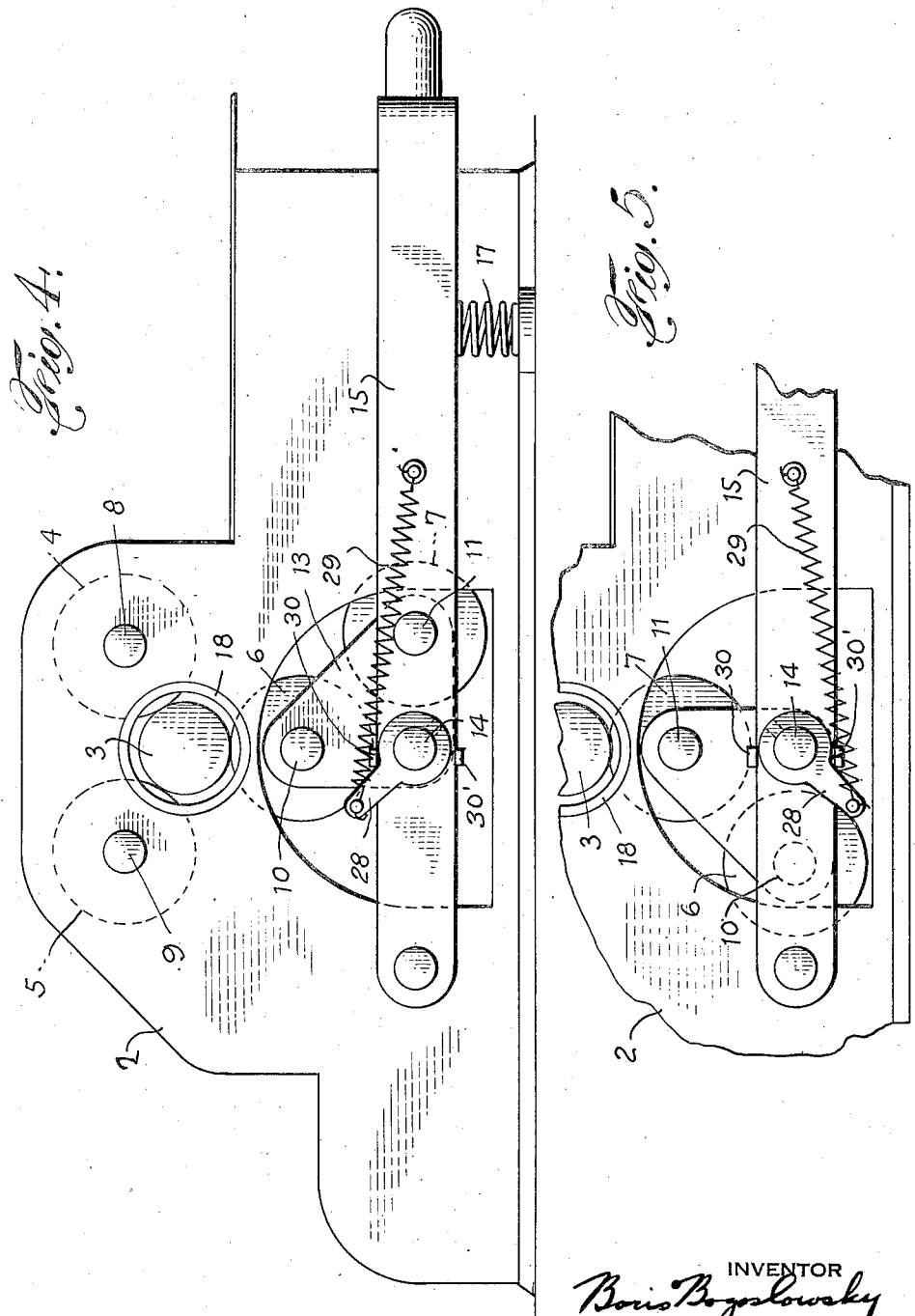

Patented Apr. 27, 1948

2,440,390

UNITED STATES PATENT OFFICE 2,440,390

APPARATUS FOR MAKING CONVOLUTE WOUND TUBING FROM SHEET MATERIAL

Boris Bogoslowsky, Jackson Heights, N. Y.

Application October 27, 1944, Serial No. 560,706

5 Claims. (Cl. 93—81)

This invention relates to apparatus for making convolute wound tubing from sheet materials. More particularly the invention relates to making such tubing from sheets of thermoplastic materials or from sheets of non-thermoplastic materials coated or laminated with thermoplastic or heat sealing materials.

It is an object of the invention to provide apparatus for winding such tubing quickly and cheaply, and to provide for heat sealing the wound tubing.

Other objects and advantages of the invention will appear hereinafter.

A preferred embodiment of the invention selected for purposes of illustration is shown in the accompanying drawings, in which, Figures 1 and 4 are side elevations of the apparatus.

Figure 2 is a section on the line 2—2 of Figure 3.

Figure 3 is a section on the line 3—3 of Figure 1.

Figure 5 is a view similar to Figure 4 showing the rollers in another position.

Referring to the drawings, the winding apparatus may be conveniently mounted on a pair of vertical side frames 1, 2 between which is mounted a suitable horizontal feeding table 40 across which the sheet material to be wound may be fed to the mandrel and winding rollers hereinafter described.

The convolute tubing is wound on a mandrel 3 which may be of any desired diameter and any desired length, depending on the size of the tubing to be wound. The mandrel is substantially cylindrical in shape, but is preferably tapered very slightly in order to facilitate removal from the wound tubing. For example, in the case of a mandrel 8" long for making 1" diameter tubing in 6" lengths if the outside diameter at one end of the mandrel is 1.001" and at the other end is .999", the taper is sufficient to facilitate removal of the tubing. If desired, however, collapsible mandrels may be employed to facilitate removal.

Said mandrel is engaged, while rolling a tubing, by three rollers spaced at intervals around its circumference, namely, the rollers 4 and 5, and one or the other of the rollers 6 and 7. Said rollers are preferably at least as long as the width of the sheet material being wound, so that in winding and heat sealing the tubing, the tubing is engaged by said rollers along its entire length. The shafts 8 and 9 of rollers 4 and 5 are journaled in the side frames 1, 2 and are mounted to rotate on parallel axes. The shafts 10 and 11 of rollers 6 and 7 are journaled in plates 12 and 13 and are also mounted on parallel axes, which said axes are also parallel to the axes of shafts 8 and 9. Plates 12 and 13 are pivotally mounted on shaft 14, and the axes of shafts 10 and 11 are equidistant from the axis of shaft 14. Therefore, by swinging the plates 12 and 13 on the shaft 14, either of the rollers 6 and 7 may be brought to the winding position occupied by the roller 6 in the drawings. Suitable means such as described hereinafter may be provided for retaining the plates with either of the rollers 6 or 7 in winding position, and suitable means may also be provided for shifting the plates and rollers from one position to another.

The ends of shaft 14 are pivoted in a U-shaped bail 15 which is pivotally mounted on the side frames at 16, said bail being urged upwardly by spring 17 to hold either the roller 6 or 7, as the case may be, against the mandrel and to hold the mandrel, in turn, against the rollers 4 and 5.

The mandrel is surrounded by a cylindrical guide tube 18, preferably open at both ends to permit insertion and withdrawal of a mandrel, which said tube serves two functions, (1) to guide and support the mandrel while the bail 15 is lowered to permit insertion or withdrawal of the mandrel, or to permit shifting of the rollers 6 and 7 to one winding position or the other, and (2) to guide the leading end of the sheet being wound circumferentially of the mandrel so that it enters successively the bights between the mandrel and rollers 5, 4 and 6 or 7. In the latter bight the leading end of the sheet is caused to tuck under the next succeeding convolution. The tube 18 is supported in the side frames and is provided with slots 19 to permit the rollers to engage the mandrel.

In the embodiment illustrated, all of the rollers 4, 5, 6 and 7 are shown as driven rollers, although it is sufficient if any one or more of the rollers engaging the mandrel is driven. Thus, in the embodiment illustrated, the shafts 8 and 9 carry pulleys 19 and 20, and the shaft 14 carries pulley 21. A belt 22 runs over all of these pulleys to a pulley 23 on a motor drive shaft. Shaft 14 also carries a pulley 24, and shafts 10 and 11 carry pulleys 25 and 26 over which runs a belt 27. Pulleys 21 and 24 are secured together or made integral, as shown, so that pulleys 24, 25 and 26 are driven by pulley 21. Pulleys 21 and 24 rotate freely on shaft 14.

A suitable means for retaining either of the rollers 6 or 7 in winding position is shown in Figure 4, comprising an arm 28 secured to the shaft 14, and a spring 29, one end of which is fastened to the end of the arm and the other end of which is fastened to the bail 15 as shown. Suitable stops 30, 30' provided to limit the motion of the plates so that the roller 6 or roller 7, as the case may be, is held in proper winding position by the tension of the spring. The arm 28 serves as a convenient means of shifting the rollers 6 and 7 from one position to another.

In the operation of the apparatus, when it is desired to wind a tubing, the bail 15 is depressed, and a mandrel 3 is inserted in the tube 18. The bail is then allowed to rise under the influence of the spring 17 to bring the roller 6 into engagement with the mandrel and to press the mandrel into engagement with rollers 4 and 5. The engagement of the mandrel by the rollers causes the mandrel to rotate in counter clockwise direction, as shown in Figure 1, the mandrel being supported during the winding operation only by the rollers.

If, now, a sheet of material is fed across the table into the bight between the mandrel and the roller 6, the leading end of the sheet will be engaged therebetween, causing the sheet to feed forwardly. As the sheet moves forwardly, the leading end of the sheet will engage the cylindrical wall of the tube 18 and will be guided circumferentially of the mandrel into the bight between the mandrel and the roller 5. As the leading end of the sheet continues to be fed forwardly, it continues to be guided by the tube 18 circumferentially of the mandrel and successively into the bight between the roller 4 and the mandrel and into the bight between the roller 6 and the mandrel, thus causing the leading end of the sheet to be tucked under the next succeeding convolution. As the rollers continue to rotate the mandrel, the action is such as to cause the sheet material to tighten itself on the mandrel so that the tubing is wound smoothly and tightly around the mandrel, such tightening of the material being due to the creep of the material as the mandrel is rolled between the surfaces of the rollers.

One of the rollers 6 or 7, as for example the roller 7, is a heated roller, and any suitable means such as a thermostatically controlled electrical heating element (not shown) mounted within the roller may be used for this purpose.

For best results in winding and heat sealing tubing, I prefer to preform the tubing, using the unheated roller for this purpose, then to shift the heated roller into winding position for the heat sealing operation. The procedure is as follows. The sheet material to be wound is usually cut to the desired length to provide the desired number of convolutions, and such a sheet is wound on the mandrel with the unheated roller 6 in winding position as previously described. Then, after the tubing is wound, I quickly shift the heated roller 7 into winding position, and continue rolling until the wound tubing is heat sealed. During the sealing operation, the material continues to be tightened on the mandrel by the rolling action as previously described. The bail may then be depressed and the mandrel may be removed from the tube 18. Then the roller 6 is shifted back into winding position ready for the next operation.

As an example of sheet materials which may be wound convolutely in the manner above described, I would mention particularly metal foil, such as aluminum foil coated or laminated with thermoplastic material such as vinyl ester resins, cellulose acetate and the like, as there are many uses for tubings made of such materials. However, various other materials may be used such as heat sealing Cellophane, or paper coated or laminated with thermoplastic or heat sealing materials.

In some cases, and particularly if the temperature of the heated roller is carefully controlled, satisfactory tubing may be produced using the heated roller only, in which case the heated roller serves both fuctions of winding and sealing. In such case, however, the temperature of the heated roller should be sufficiently low to permit the winding of the tubing to be completed before the heat transmitted to the tubing is sufficient for sealing purposes, thus permitting the tubing to be tightly wound on the mandrel before sealing.

A variation in the method of using the apparatus which is particularly adapted for winding and heat sealing tubing made from sheets which have been printed or otherwise decorated, in order to avoid damage to such printing or decorating during the winding or heat sealing operations, is as follows. I first wind a sheet of such material on the mandrel as previously described. Then, I feed in a sheet of very thin, smooth surfaced, non-thermoplastic material and wind this sheet around the previously wound tubing. A sheet of Cellophane having a thickness of approximately .001" is admirably suited for this purpose. Then, after such a protective sheet has been wound around the tubing, I shift the heated roller 7 into the winding position and heat seal the tubing as before. After withdrawal of the mandrel the sheet of Cellophane may be unwound from the finished, sealed tubing.

A still further variation in the method of using the apparatus is as follows. Sheets of materials of different kinds may be fed successively into the apparatus and wound successively on the mandrel to form a laminated tubing. Various combinations of sheet materials may be employed depending on the characteristics desired in the finished tubings. For example, a sheet of non-thermoplastic material such as metal foil may be laminated with a sheet or sheets of thermoplastic material such as cellulose acetate film or vinyl ester resin film. In this case, I prefer to first wind the successive laminations into tubings with the unheated roller 6, then heat seal the laminated tubings with the heated roller 7 as previously described.

In all cases, I prefer to allow the heat sealed tubing to cool substantially to room temperature while retained on the mandrel and prior to removing the tubing from the mandrel. In the case of most thermoplastic and heat sealing materials with which I am familiar, some shrinkage occurs during cooling. This serves to tighten the tubing on the mandrel, creating a condition of circumferential tension and radial compression which improves the quality of the finished tubing. Thus, the overlapping plies of the wound tubing are sealed under compression, and very tight, uniform adhesion results. Furthermore, the tube wall is very smooth and even.

It will be understood that the invention may be variously modified and embodied within the scope of the subjoined claims.

I claim as my invention:

1. Apparatus for making convolute wound tubing from sheet material, comprising, a pair of side frames, a pair of rollers journaled in said side frames, a member pivotally mounted on said side frames, a pair of plates pivotally mounted on said member, a second pair of rollers journalled in said plates, all of said rollers having parallel axes, said plates being adapted to pivot on said member to permit one or the other of said second pair of rollers to be shifted to winding position opposite said first pair of rollers.

2. Apparatus for making convolute wound tubing from sheet material, comprising, a pair of side frames, a pair of rollers journaled in said side frames, a member pivotally mounted on said side frames, a pair of plates pivotally mounted on said member, a second pair of rollers journaled in said plates, all of said rollers having parallel axes, said plates being adapted to pivot on said member to permit one or the other of said second pair of rollers to be shifted to winding position opposite said first pair of rollers, and means for retaining either one or the other of said second pair of rollers in winding position.

3. Apparatus for making convolute wound tubing from sheet material, comprising, a mandrel, a frame, a pair of rollers journaled on said frame to rotate thereon, a pair of supporting members movably mounted with respect to said frame, a third roller journaled on said supporting members to rotate thereon, all of said rollers being mounted to rotate on parallel axes arranged around said mandrel and each of said rollers being at least as long as the width of the material to be wound on said mandrel, a tube surrounding said mandrel, said tube having slots therein to permit the peripheral surfaces of said rollers to engage the peripheral surface of said mandrel and to permit a sheet of material to enter said tube, said tube serving to guide the leading end of a sheet of material circumferentially of said mandrel, and means for moving said supporting members and said third roller toward and away from said mandrel.

4. Apparatus for making convolute wound tubing from sheet material, comprising, a mandrel, a frame, a plurality of rollers mounted on said frame to rotate on parallel axes arranged around said mandrel, the peripheral surfaces of said rollers being spaced to engage the peripheral surface of said mandrel, means for driving at least one of said rollers to rotate said mandrel to feed the leading end of a sheet of material between one of said rollers and said mandrel, and means for guiding the leading end of said sheet circumferentially of said mandrel as said mandrel rotates to cause the leading end to feed into the bight between each of said rollers and said mandrel and tuck under the next succeeding convolution.

5. Apparatus for making convolute wound tubing, comprising, a mandrel, a frame, a pair of rollers journaled on said frame to rotate thereon, a pair of supporting members movably mounted with respect to said frame, a third roller journaled on said supporting members to rotate thereon, all of said rollers being mounted to rotate on parallel axes arranged around said mandrel, the peripheral surfaces of said rollers being spaced to engage the peripheral surface of said mandrel, a tube surrounding said mandrel, said tube having slots therein to permit said rollers to engage said mandrel and to permit a sheet of material to enter said tube, said tube being open at both ends to permit insertion and withdrawal of said mandrel, and means for moving said supporting members and said third roller toward and away from said mandrel.

BORIS BOGOSLOWSKY.

REFERENCES CITED

The following references are of record in the file of this patent:

UNITED STATES PATENTS

| Number | Name | Date |
|---|---|---|
| 155,703 | Burgess | Oct. 6, 1874 |
| 157,970 | Mottram | Dec. 22, 1874 |
| 171,347 | Broas | Dec. 21, 1875 |
| 1,921,516 | Frederick | Aug. 8, 1933 |
| 2,085,017 | Funkhouser et al. | June 29, 1937 |

FOREIGN PATENTS

| Number | Country | Date |
|---|---|---|
| 257,157 | Germany | Feb. 28, 1913 |